United States Patent [19]
Tsuchihashi et al.

[11] 4,168,070
[45] Sep. 18, 1979

[54] SEALING DEVICE FOR SHAFT

[75] Inventors: Yasuo Tsuchihashi, Yokohama; Tuneo Yamaguchi, Urawa, both of Japan

[73] Assignee: Niigata Engineering Co., Ltd., Tokyo, Japan

[21] Appl. No.: 915,849

[22] Filed: Jun. 15, 1978

[30] Foreign Application Priority Data

Dec. 27, 1977 [JP] Japan .............................. 52-175160[U]

[51] Int. Cl.² ........................ F16J 15/32; F16J 15/46
[52] U.S. Cl. .......................................... 277/3; 277/15; 277/27; 277/28; 277/72 FM; 277/153
[58] Field of Search ................... 277/3, 15, 16, 27, 28, 277/59, 72 R, 72 FM, 153

[56] References Cited

U.S. PATENT DOCUMENTS

| | | | |
|---|---|---|---|
| 3,088,744 | 5/1963 | Ezekiel et al. ............................ | 277/3 |
| 3,176,996 | 4/1965 | Barnett ................. | 277/3 X |
| 3,403,915 | 10/1968 | Roberts ................. | 277/59 X |
| 3,631,834 | 1/1972 | Gardner et al. ........ | 277/3 X |

FOREIGN PATENT DOCUMENTS

1434989 3/1966 France ....................... 277/59

Primary Examiner—Robert S. Ward, Jr.
Attorney, Agent, or Firm—Sughrue, Rothwell, Mion, Zinn and Macpeak

[57] ABSTRACT

The sealing oil in a sealing device for an underwater propeller shaft as maintained at the optimum operating pressure by providing a pressure increasing device in which an oil chamber communicating with the sealing oil and a sea water chamber communicating with the sea water in the vicinity of the propeller shaft are separated by a movable member, e.g., a bellows.

6 Claims, 5 Drawing Figures

SEALING DEVICE FOR SHAFT

BACKGROUND OF THE INVENTION

The present invention relates to a sealing device for a rotating shaft such as a propelling shaft which is disposed in the water.

In a working ship such as a semisubmercible petroleum boring rig and crane barge, a ship position controlling device is provided for cruising or moving and stopping at a predetermined position on the berth. The controlling device comprises a propelling device disposed in the sea water. In such a propelling device, a shaft, a bearing and all frictionally engaging surfaces are lubricated and cooled by providing a lubricating oil thereto, and a shaft sealing device such as an oil seal is provided for preventing both oil leakage from the propelling shaft and sea water invasion. Also, in such a marine working ship, since the ballasting water must be changed corresponding to the sea condition, weather and working purpose, the propelling device has been often used in water of 6 to 35 m in depth. Generally, if the depth of the propelling device is greatly varied, for example in a large capacity oil tanker, in order to maintain optimum operating conditions for the shaft shielding device the sealing pressure is maintained at 0.5–1.0 kg/cm lower than the sea water pressure at the same level of depth, corresponding to the amount of the ballasting water, by a high-low changeover head tank method for generating a sealing hydraulic pressure.

However, in a marine working ship, the depth of the propelling device is frequently and greatly varied. Therefore, it is impossible to maintain the full function of the sealing device for the propelling device. Thus, there is a great possibility of oil leakage and quick abrasion in the sealing device.

SUMMARY OF THE INVENTION

In view of the above defect, it is an object of the present invention to provide a sealing device for the propelling shaft wherein the oil seal pressure is accurately controlled to be somewhat lower than that of the sea water adjacent thereto.

Briefly, this is accomplished by providing a pressure controlling device having first and second chambers communicating with the sealing oil and with the sea water in the vicinity of the propeller shaft, respectively. The chambers are separated by a movable member, e.g., a bellows which is preferably biased toward the oil pressure decreasing position. An oil filler system is also provided for feeding oil to the first chamber from a lubricating oil circuit when necessary.

DETAILED DESCRIPTION OF THE INVENTION

Figure 1:
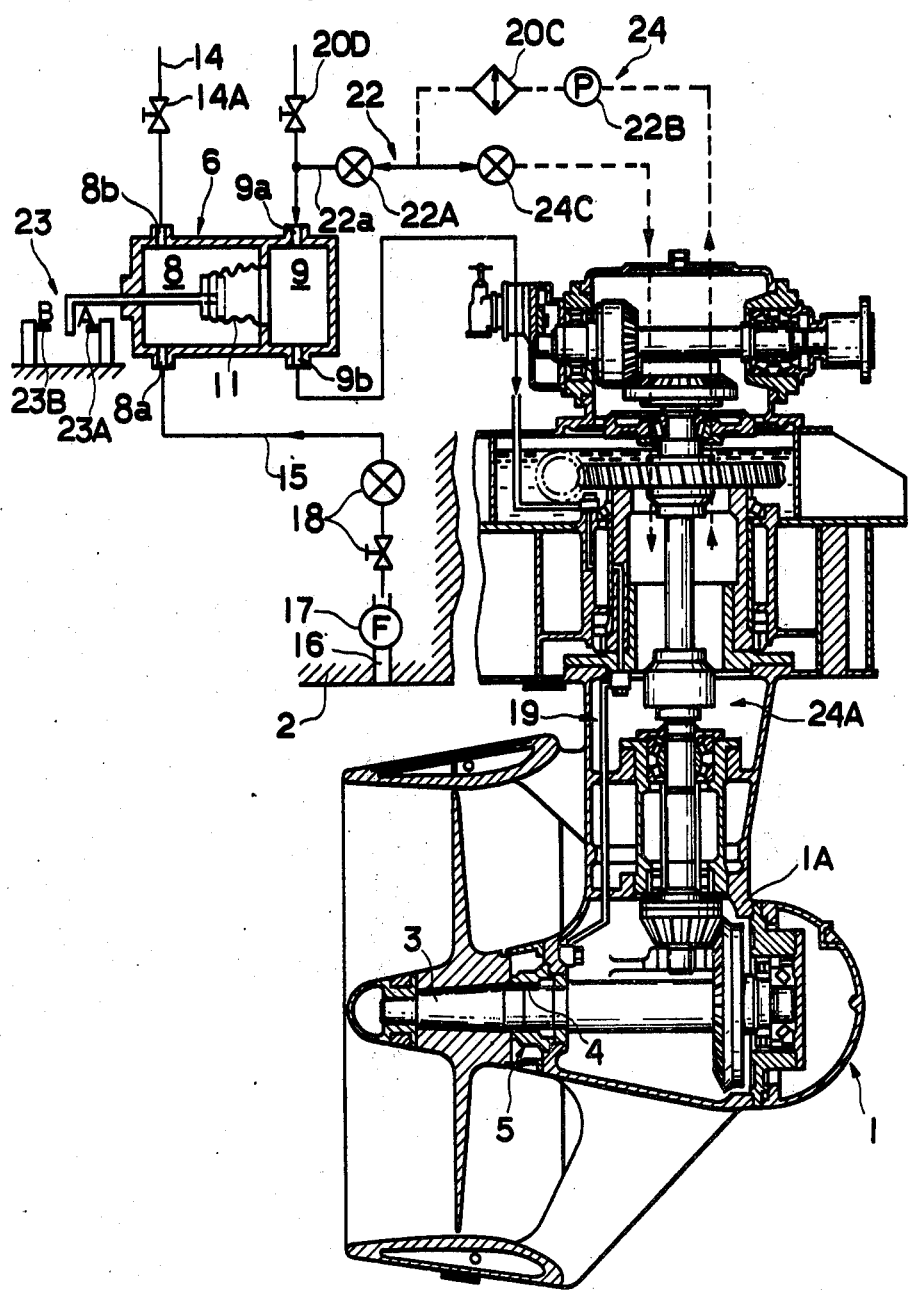
FIG. 1 is a schematic view of the sealing device for the propeller shaft according to the present invention.

In FIG. 1, reference numeral 1 designates a propelling device of a marine drafting apparatus such as semisubmercible petroleum boring rig which is used in relatively deep water. A body 1A of the propelling device is rotatably mounted on a lower hull of a device for lifting to the water surface.

Figure 2:
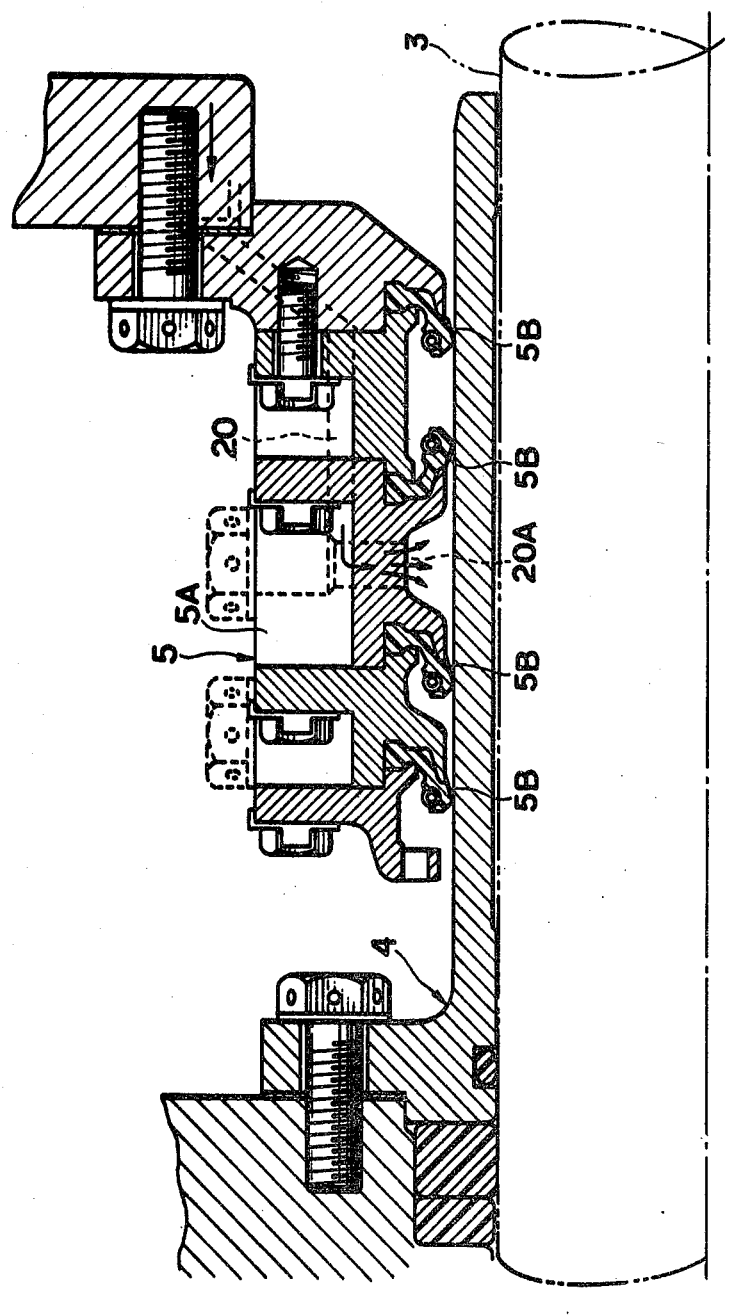
FIG. 2 is a cross sectional view of the oil seal of the propeller shaft according to the present invention.

Numeral 3 designates a propeller shaft rotatably supported in the propelling device 1A. Numeral 5 designates a shaft sealing device on the periphery of a sleeve 4 engaged with the propeller shaft 3. As shown in FIG. 2, the shaft sealing device 5 comprises a plurality of oil seals 5B and backup ring 5A. The oil seals 5B are supported by the back-up ring 5A.

On the other hand, a lubricating oil feeding circuit 24 provides the propeller shaft 3 with lubricating oil from an oil tank 24A formed in the propelling device body 1A through an oil pump 22B, a cooler 22C and a solenoid valve 24C. A sealing oil feeding circuit 22 provides the oil seal portion of the propeller shaft 3 with a sealing oil which is obtained from the lubricating oil feeding circuit 24 through another solenoid valve 22A.

Figure 3:
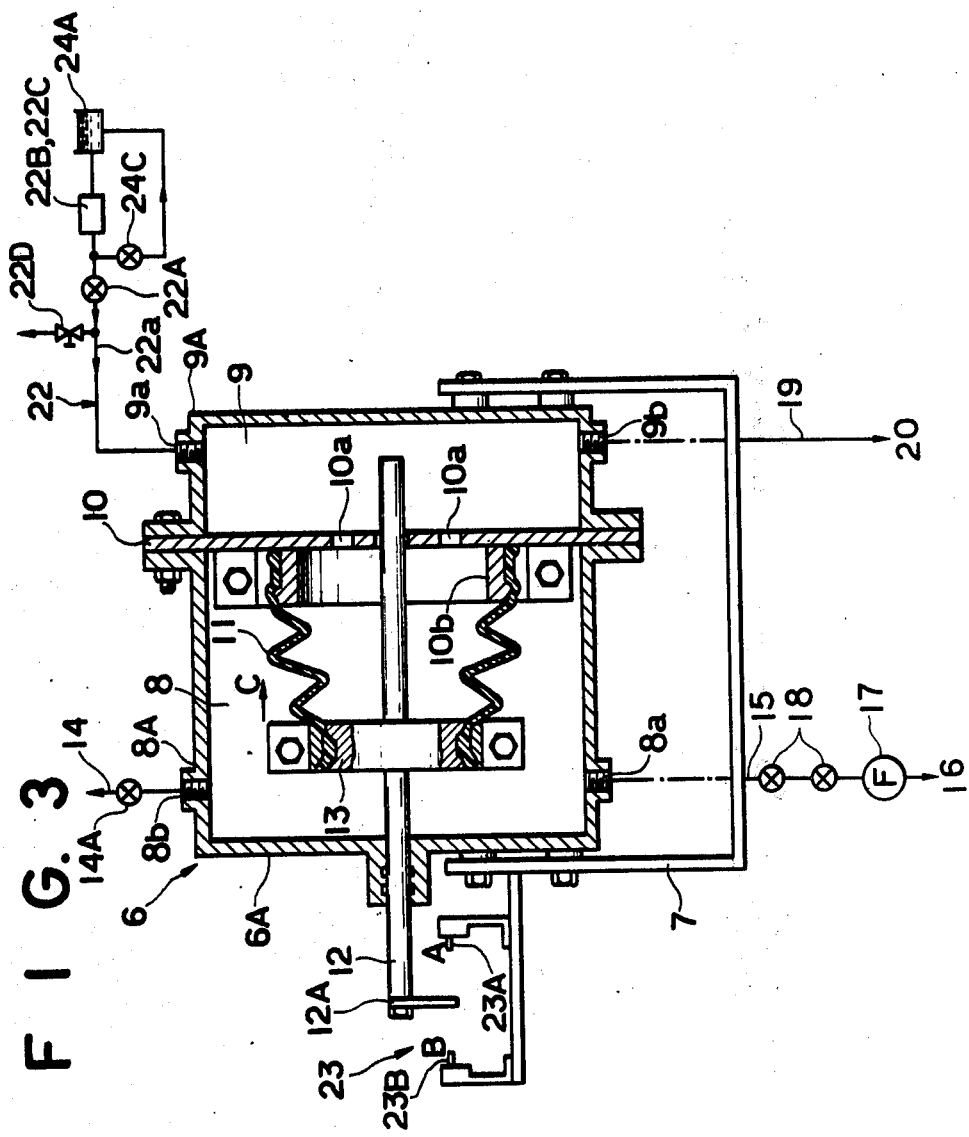
FIG. 3 is a schematic view of the sealing oil pressure increasing device according to the present invention.

A sealing oil pressure increasing device 6 is also provided. The sealing oil pressure increasing device 6 is shown more clearly in FIG. 3 wherein numeral 6A designates a body thereof mounted on a suitable portion, such as an upper portion, of the propelling device body by a frame member 7. Numerals 8 and 9 designate a sea water pressure operating chamber and an oil pressure chamber which are divided by a partition wall 10 having a pair of communicating holes 10a. The chamber 8 is further divided by a bellows 11.

One end of the bellows 11 is connected to a boss 10b of the partition wall 10 and the other end of the bellows 11 is connected to a supporting portion 13 fixed to the rod which, in turn, is slidably supported in suitable holes in both the partition wall and one wall of the body 6A. The bellows have a resiliency which may be enhanced by providing a spring (not shown) or by constructing the bellows of a stainless steel having a desired spring constant. Holes 8a and 8b which are formed in the walls of the sea water pressure operating chamber are air exhausting ports and water charging/discharging ports. The port 8a communicates with a sea water introducing pipe 15 through valves 18 and a filter 17. The sea water introducing pipe 15 communicates with a portion in the vicinity of the propeller shaft 3, for example, by a port 16 which is formed in the bottom portion of the sea water surface lifting device 2 as shown in FIG. 1. The air exhausting port 8b communicates with the atmosphere through a pipe 14 in which an air exhausting valve 14A is provided. Numerals 9a and 9b designate sealing oil charging/discharging ports which are formed in the peripheral walls 9A of the oil pressure chamber 9. The sealing oil introducing port 9a communicates with the aforedescribed lubricating oil feeding circuit 24 through the pipe 22a of the sealing oil feeding circuit 22 in which a solenoid valve 22A is provided. Numeral 22D is an air exhausting valve which is provided in a branched pipe from the main pipe 22a. The sealing oil discharging port 9b communicates with a sealing oil feeding pipe 19. The end of the sealing oil feeding pipe 19 communicates with a sealing oil feeding passage 20 which is formed in the propeller shaft shielding device 5 as shown in FIG. 2.

This sealing oil feeding passage 20 communicates with a space difined between the annular backup ring 5A and the sleeve 4 so as to form a sealing oil feeding port 20A.

As is clearly known from such a construction of the piping system, the sealing oil pressure increasing device 6 is so formed that the sea water is introduced thereinto from the vicinity of the oil seal portion of the propeller shaft, and when the solenoid valve 22A is closed, the sealing oil within the oil pressure chamber 9 is effectively pressurized by sea water pressure thereby introducing the sealing oil into the oil seal portion. Further, the sealing oil pressure increasing device 6 is provided with an oil amount detecting device 23 which serves to detect the amount of the sealing oil within the watertight oil pressure chamber 9 by detecting the position of the bellows 11.

The oil amount detecting device 23 includes a lever 12A which is secured to the rod 12. Signals are generated by the relation of the pressures of the oil and the sea water within the chamber 6. More specifically, oil feeding starting signals (at position A) or oil feeding stopping signals (at position B) are transmitted to the solenoid valves 22A and 24C. The signals are generated by the position of the lever 12A in the oil amount detecting device 23.

In operation, when the propelling device 1 is in a shallow position in sea water, the solenoid valve 22A is opened to thereby introduce a sealing oil from the lubricating oil feeding circuit 24 into the oil seal portion without pressurizing the oil pressure chamber 9.

The sealing oil is introduced through the sealing oil discharging port 9b and a pipe 19 to the sealing oil feeding port 20A which communicates with the space defined by the annular backup ring and the sleeve, as shown in FIG. 2. If the sealing oil feeding is achieved, the solenoid valve is closed.

Then, when the sea water surface lifting device 2 dives deeply in the water, the sea water is introduced from the sea water introducing port 16 through the pipe 15 and the port 8a formed in the sealing oil pressure increasing device 6 into the pressure operating chamber 8. When the pressure operating chamber 8 is filled with sea water, the pressure of the sea water is applied to the bellows 11 whereby the bellows are moved toward the arrow C in FIG. 3 against its spring or resilient force by an amount corresponding to the sea water pressure. As the bellows are retracted, the sealing oil pressure within the sealing oil chamber 9 is increased. The bellows are balanced when the pressure within the sea water chamber 8 is equal to that within the sealing oil chamber 9.

In such a balanced state, the relation between the sea water pressure $P_A$ and the sealing oil pressure of the oil seal portion will be explained in reference to FIG. 4.

Figure 4:
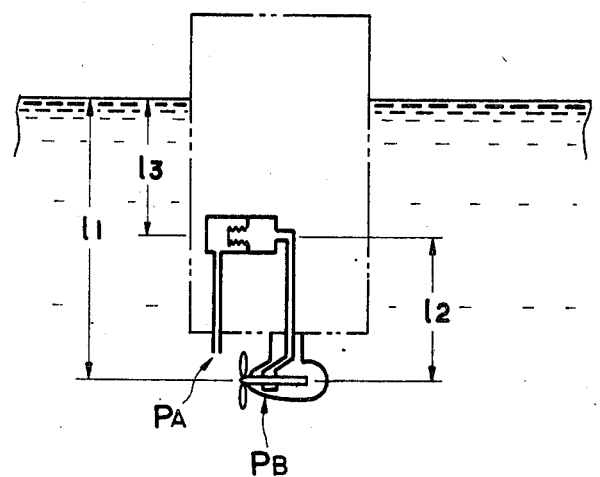
FIG. 4 explains the effect of the sealing device according to the present invention.

In FIG. 4;

$l_1$ is the depth from the sea water surface to the propeller shaft;

$l_2$ is the depth from the sealing oil pressure increasing device to the propeller shaft;

$l_3$ is the depth from the sea water surface to the sealing oil pressure increasing device;

$\gamma_1$ is the specific gravity of the sea water;

$\gamma_2$ is the specific gravity of the sealing oil; and $\Delta P_o$ is the spring pressure of the bellows.

The pressure of the sea water adjacent to the propeller shaft is given as:

$$P_A = l_1 \gamma_1$$

The pressure of the oil seal is:

$$P_B = l_3 \gamma_1 - \Delta P_o + l_2 \gamma_2$$

The difference pressure $\Delta P$ between the pressure $P_A$ and the pressure $P_B$ is as follows:

$$\Delta P = P_A - P_B = l_2(\gamma_1 - \gamma_2) + \Delta P_o \qquad (1)$$

In the above equation, the difference pressure $\Delta P$ is determined by $l_2$ (the depth from the sealing oil pressure increasing device to the propeller shaft) and $\Delta P_o$ (the spring pressure of the bellows). The spring pressure $\Delta P_o$ is variable in response to the depth $l_1$, that is, the depth $l_3$ from the sea water surface to the sealing oil pressure balancing device 6, if the spring constant is a constant value.

As maintained before, the sealing pressure $P_B$ is established at a 0.5-1.0 kg/cm$^2$ smaller than value than the pressure $P_A$ of the sea water to thereby obtain effective sealing. Therefore, in order to obtain the value in such range, the length $l_2$ and the spring constant of the bellows, i.e., $\Delta P_o$, should be determined.

On the other hand, the amount of the sealing oil in the sealing oil chamber is decreased due to the oil leakage of the propeller shaft shielding device 5 and the like and, thus, the equivalent position of the bellows 11 is moved toward the partition wall 10 and reaches to the phantom line in FIG. 1 so that the lever 12A secured to the rod 12 is in abutment with the detecting switch 23A. As a result, the signals are transmitted to the solenoid valves 22A and 24C to thereby open the valve 22A and at the same time close the valve 24C. Accordingly the lubricating oil circulation between the tank 24A and the valve 24C are stopped and the lubricating oil pumped up from the oil tank 24A by the pump 22B is fed through the opened solenoid valve 22A, the pipe 22a and the sealing oil charging port 9a to the sealing oil pressure chamber 9 as a sealing oil.

After the sealing oil is thus fed, the equivalent position of the bellows nears to the end wall of the pressure operating chamber 8A. When the lever 12A is in abutment with the detecting switch B, the solenoid valve 24C is opened and at the same time the solenoid valve 22A is closed to thereby stop the oil feeding and again start the lubricating oil circulation.

As mentioned above, the pressure of the sealing oil chamber 9 is established at a somewhat lower than that of the sea water by introducing the sea water from the vicinity of the oil seal portion into the chamber 9 while the solenoid valve 22A is closed. Accordingly, lubricating oil leakage and invasion of sea water at the oil seal can be effectively prevented.

Figure 5:
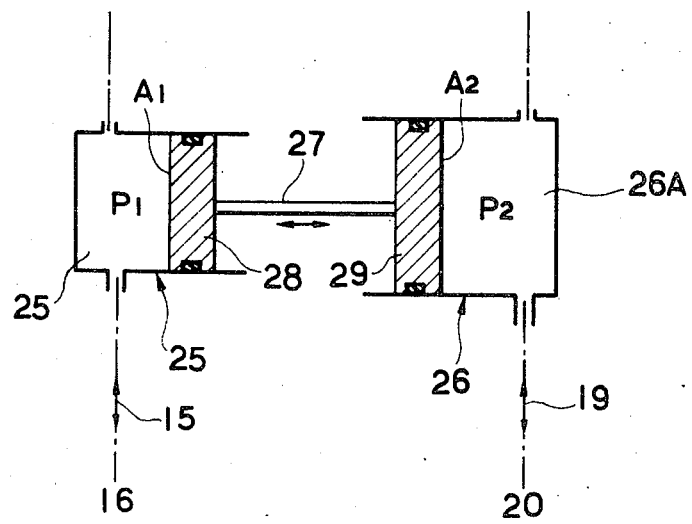
FIG. 5 is another embodiment of the sealing oil pressure increasing device according to the present invention.

FIG. 5 shows another embodiment of a sealing oil pressure increasing device according to the present invention. The sealing oil pressure increasing device comprises a pair of pistons 28 and 29 connected by a piston rod 27 and large and small cylinders 25 and 26 associated with the pistons 28 and 29, respectively. The sea water in the vicinity of the oil seal portion of the propeller shaft 3 is introduced into the head side chamber 25A of the small cylinder 25 while the sealing oil of the sealing oil feeding circuit 22 is introduced into the head side chamber 26A of the large cylinder 26. The operation of this embodiment is the same as the aforementioned embodiment with the difference in surface area of the two pistons providing the value $\Delta P_o$.

Additionally, in the embodiments of the present invention, the propeller device of the semisubmercible petroleum boring rig is explained. However, the spirit and technique of the present invention is applicable to any device which is always used within the water and rotational shaft of which is exposed thereto.

As mentioned above, in the present invention, the pressure of the oil seal portion for the rotational shaft disposed in the water is the same as or somewhat smaller than that of the sea water in the periphery of the oil seal portion. Therefore, the water invasion into the bearing portion and the rotational abrasion portion inherent to the conventional device is effectively prevented in the device according to the present invention. Further, the leakage of the sealing oil into the rotational abrasion portion which is also inherent to the conventional device is effectively prevented in the device according to the present invention. The lubricating and cooling effect of the lubricating oil is well maintained. The temperature increase in the bearing portion of the rotational shaft which causes the fuse-contact of the rotational shaft and the accidental abrasion of the rotational shaft are effectively prevented in the device according to the invention.

Further, the oil circuit is divided into the sealing oil pressure increasing circuit for feeding the sealing oil to the oil portion and the rotational shaft lubricating oil circulating circuit. The lubricating oil is automatically supplied to the sealing oil pressure increasing circuit when such change-over is necessary. Accordingly, the operation of the sealing oil increasing circuit is more positively accomplished and it is unnecessary to increase the pressure of the large amount of lubricating oil in the lubricating oil circulating circuit, thereby miniaturizing the pressure increasing device so that it is easily manufactured.

What is claimed is:

1. A sealing device for an underwater device having a rotational shaft disposed in the water, of the type having an oil seal for preventing the invasion sea water around said shaft into said underwater device the improvement comprising:
   a lubricating oil feeding circuit;
   a sealing oil feeding circuit having a first valve for introducing a lubricating oil from said lubricating oil feeding circuit through said first valve to said oil seal as a sealing oil;
   a sealing oil pressure increasing device in said sealing oil feeding circuit for pressurizing the sealing oil within the sealing oil feeding circuit to a pressure corresponding to the diving depth of said underwater device by introducing sea water from the vicinity of said oil seal into said pressure increasing device when the first valve is closed; and
   a sealing oil amount detecting device for detecting the amount of the sealing oil within the sealing oil feeding circuit and generating opening and closing signals in response to the amount of sealing oil detected, said first valve opening and closing in response to said opening and closing signals, respectively, so that the amount of sealing oil within the sealing oil feeding circuit is maintained at a desirable value by said opening and closing signals.

2. A sealing device as defined in claim 1, wherein said sealing oil pressure increasing device comprises pressure operating and oil pressure chambers communicable with sea water and said sealing oil feeding circuit, respectively, said chambers being separated by a movable member so that sea water pressure introduced into said pressure operating chamber will control the oil pressure in said sealing oil feeding circuit.

3. A sealing device as defined in claim 2, wherein said chambers are separated by a bellows member which is biased in a direction for increasing the volume of said oil pressure chamber.

4. A sealing device as defined in claim 2, wherein said sealing oil pressure increasing device includes a pair of opposed cylinders having small and large diameters and a pair of associated pistons both of which are connected by a rod, said small diameter cylinder being said pressure operating chamber while said large diameter cylinder is said oil pressure chamber and said movable member comprises said pistons secured by said connecting rod.

5. A sealing device as defined in claims 2, 3 or 4, wherein said sealing oil detecting device comprises a pair of position detecting switches for detecting the position of said movable member.

6. A sealing device as defined in claim 5, wherein said sealing oil amount detecting device further comprises a rod secured to said movable member and a lever secured to said rod and extending between said pair of position detecting switches.

* * * * *